(12) United States Patent
Terävä

(10) Patent No.: US 10,805,900 B2
(45) Date of Patent: Oct. 13, 2020

(54) METHOD AND DEVICE FOR DERIVING LOCATION

(71) Applicant: Sharp & Sharper Oy, Lieto (FI)

(72) Inventor: Henrik Terävä, Lieto (FI)

(73) Assignee: Sharp & Sharper Oy, Lieto (FI)

( * ) Notice: Subject to any disclaimer, the term of this patent is extended or adjusted under 35 U.S.C. 154(b) by 0 days.

(21) Appl. No.: 16/159,914

(22) Filed: Oct. 15, 2018

(65) Prior Publication Data

US 2019/0116576 A1    Apr. 18, 2019

(30) Foreign Application Priority Data

Oct. 16, 2017   (FI) ...................................... 20177118

(51) Int. Cl.
  *H04W 64/00* (2009.01)
  *H04W 4/02* (2018.01)
  (Continued)

(52) U.S. Cl.
  CPC ......... *H04W 64/003* (2013.01); *G01S 5/0027* (2013.01); *H04W 4/021* (2013.01);
  (Continued)

(58) Field of Classification Search
  CPC ... H04W 64/003; H04W 4/021; H04W 4/027; H04W 4/029; H04W 4/80; H04W 4/025; H04W 52/0274; H04W 12/06; H04W 52/0248; H04W 8/24; Y02D 70/00; Y02D 70/142; Y02D 70/144; G01S 5/0009; G01S 5/0027; G08B 21/0288; G08B 25/016; G08B 13/1436; G08B 21/02; H04M 1/7253; H04M 2250/10
  See application file for complete search history.

(56) References Cited

U.S. PATENT DOCUMENTS

2006/0092890 A1* 5/2006 Gupta ................... H04W 4/029
                                                                370/338
2009/0303066 A1* 12/2009 Lee ................... H04M 3/42136
                                                                340/679
(Continued)

FOREIGN PATENT DOCUMENTS

GB          2383666 A    7/2003
KR     20160087323 A    7/2016

*Primary Examiner* — Quoc Thai N Vu
(74) *Attorney, Agent, or Firm* — Ziegler IP Law Group, LLC

(57) ABSTRACT

A method and device for deriving a location. The method includes measuring, with a first sensor, movement as a function of time during a first period of time; deriving a typical movement area and a typical movement schedule using the measured movement; measuring, with the first sensor, movement as a function of time during a second period of time, wherein the second period of time corresponds to the first period of time; comparing the measured movement as a function of time during the second period of time with the derived typical movement area and the typical movement schedule; and initiating a second sensor to determine a current location if the measured movement as a function of time during the second period of time is not within the derived typical movement area or not aligned with the derived typical movement schedule based on the comparison.

30 Claims, 6 Drawing Sheets

(51) Int. Cl.
  *G01S 5/00*    (2006.01)
  *H04W 4/021*   (2018.01)
  *H04W 8/24*    (2009.01)
  *H04W 4/029*   (2018.01)

(52) U.S. Cl.
  CPC .......... *H04W 4/027* (2013.01); *H04W 4/029* (2018.02); *H04W 8/24* (2013.01)

(56) References Cited

U.S. PATENT DOCUMENTS

| | | | |
|---|---|---|---|
| 2010/0267361 A1* | 10/2010 | Sullivan | G01S 19/17 455/404.2 |
| 2012/0188065 A1 | 7/2012 | Garigen | |
| 2012/0235860 A1* | 9/2012 | Ghazarian | G01S 19/16 342/357.4 |
| 2013/0045759 A1* | 2/2013 | Smith | H04W 4/029 455/456.6 |
| 2014/0062695 A1* | 3/2014 | Rosen | G08B 21/18 340/539.13 |
| 2016/0073351 A1* | 3/2016 | Cardozo | H04W 52/0258 455/574 |
| 2016/0142862 A1 | 5/2016 | Coenen et al. | |
| 2016/0174099 A1* | 6/2016 | Goldfain | A61D 17/00 375/130 |
| 2017/0193443 A1* | 7/2017 | Barcala | H04W 4/02 |
| 2017/0215034 A1* | 7/2017 | Blowers | H04W 4/021 |
| 2018/0285829 A1* | 10/2018 | Hostyn | G06F 17/248 |
| 2019/0026450 A1* | 1/2019 | Egner | H04W 4/029 |

\* cited by examiner

METHOD AND DEVICE FOR DERIVING LOCATION

TECHNICAL FIELD

The present disclosure relates generally to electronic devices for providing location services; and more specifically, to a method of deriving a location. Furthermore, the present disclosure also relates to a device for deriving a location.

BACKGROUND

In the last few decades, there has been a tremendous increase in the number and type of electronic devices available to the consumers. Electronic devices commonly provide some way of communicating status information. Such status information can include any type of information including current location of a subject. For example, many cellular telephones are not only equipped with cellular and Wi-Fi radios, but also GPS functionality which permits them to, for example, report their locations to remote parties, obtain real-time point-to-point directional information, etc. In addition, one particular service is the ability for one or a group of related electronic devices (such as a group of cellular telephones related by virtue of their use by family members) to identify the location of the other devices at any given moment.

However, with increasing number of electronic devices need to be carried by a user, it has become a trend to make the electronic device more and more portable. In particular, electronic tags which can be carried by a subject for transmitting current location data has to be designed to be very portable so as to be almost unobtrusive in day-to-day functioning of the subject. This trend has led to decrease in size, and thereby capacity of the batteries of such portable electronic devices. Generally, electronic devices already have a limited battery capacity. Measurements with sensors, especially using satellite and mobile network transmissions using some or all of on-board radios and GPS transceivers/chipsets, can lead to large battery drain. For instance, use of regular GPS readings to constantly pinpoint a user's location can cut a smartphone's battery time in half or more. Readings from Wi-Fi access points generally require less power, but enough that repeated readings will also substantially decrease observed battery life of such devices. This increases the frequency with which a user of such devices must recharge the battery, which is generally an inconvenience, and sometimes even impractical.

In order to conserve battery, some power management schemes have been proposed in the prior art. For instance, these technique provides that measurement and transmission are performed according to a predetermined timing. However, such schemes do not necessarily provide the right kind of sensor data at the right time.

Therefore, in light of the foregoing discussion, there exists a need to overcome the aforementioned drawbacks associated with deriving location data for providing location services.

SUMMARY

The present disclosure seeks to provide a method of deriving a location. The present disclosure also seeks to provide a device for deriving a location. The present disclosure seeks to provide a solution to the existing problem of inefficient processes of determining a current location which is battery intensive. An aim of the present disclosure is to provide a solution that overcomes at least partially the problems encountered in prior art, and provides an efficient method and device for deriving location using comparatively much less battery charge.

In one aspect, an embodiment of the present disclosure provides a method of deriving a location comprising:
measuring, with a first sensor, movement as a function of time during a first period of time;
deriving a typical movement area and a typical movement schedule using the measured movement as a function of time during the first period of time;
measuring, with the first sensor, movement as a function of time during a second period of time, wherein the second period of time corresponds to the first period of time;
comparing the measured movement as a function of time during the second period of time with the derived typical movement area and the typical movement schedule; and
initiating a second sensor to determine a current location if the measured movement as a function of time during the second period of time is not within the derived typical movement area or not aligned with the derived typical movement schedule based on the comparison.

Optionally, the first sensor implements one or more of an accelerometer, a gyroscope, Bluetooth, Bluetooth Low Energy (BLE) and Wi-Fi standards techniques for measuring movement, and the second sensor implements on one or more of mobile networks or satellite based navigation techniques for measuring movement.

Optionally, the satellite based navigation techniques comprise one or more of Global Positioning System (GPS), Global Navigation Satellite System (GLONASS), Galileo, BeiDou Navigation Satellite System and Indian Regional Navigation Satellite System (IRNSS).

Optionally, the method further comprises implementing a mesh network by the first sensor for measuring movement.

Optionally, the method further comprises at least one of: communicating the current location to a cloud server, alerting a user and sending an alert notification to a third party using a communication module, if the measured movement as a function of time during the second period of time is not within the derived typical movement area or not aligned with the derived typical movement schedule based on the comparison.

Optionally, the method further comprises implementing one or more of General Packet Radio Service (GPRS), Long-Term Evolution (LTE), Wi-Fi, Low Power Wide Area Network (LPWA) and Satellite Internet access by the communication module for transmission of data.

Optionally, the method further comprises implementing a mesh network by the communication module for transmission of data.

Optionally, the method further comprises pre-caching of credentials, by a cloud server, of one or more communication networks installed in the typical movement area, in the communication module.

Optionally, the method further comprises communicating a last location, as determined by either the first sensor or the second sensor, via the communication module if the connectivity with a communication network begins to deteriorate.

Optionally, the method further comprises optimizing wake-up times for one or more of the first sensor and the second sensor based on the typical movement schedule.

In another aspect, an embodiment of the present disclosure provides a device for deriving a location comprising:

a first sensor configured to measure movement as a function of time during a first period of time and a second period of time, wherein the second period of time corresponds to the first period of time;

a second sensor configured to determine location; and a controller configured to:

derive a typical movement area and a typical movement schedule using the measured movement as a function of time during the first period of time;

compare the measured movement as a function of time during the second period of time with the derived typical movement area and the typical movement schedule; and initiate the second sensor to determine a current location if the measured movement as a function of time during the second period of time is not within the derived typical movement area or not aligned with the derived typical movement schedule based on the comparison.

Optionally, the first sensor is configured to implement one or more of an accelerometer, a gyroscope, Bluetooth, Bluetooth Low Energy (BLE) and Wi-Fi standards techniques for measuring movement, and the second sensor implements on one or more of mobile networks or satellite based navigation techniques for measuring movement.

Optionally, the satellite based navigation techniques comprise one or more of Global Positioning System (GPS), Global Navigation Satellite System (GLONASS), Galileo, BeiDou Navigation Satellite System and Indian Regional Navigation Satellite System (IRNSS).

Optionally, the first sensor is configured to implement a mesh network for measuring movement.

Optionally, the device further comprises a communication module, wherein the controller is further configured to at least one of: communicate the current location to a cloud server, alert a user and send an alert notification to a third party using the communication module, if the measured movement as a function of time during the second period of time is not within the derived typical movement area or not aligned with the derived typical movement schedule based on the comparison. Further optionally the controller can be configured to indicate a state change in the device, for instance using a light indicator or haptic feedback.

Optionally, the communication module is configured to implement one or more of General Packet Radio Service (GPRS), Long-Term Evolution (LTE), Wi-Fi, Low Power Wide Area Network (LPWA) and Satellite Internet access for transmission of data.

Optionally, the communication module is configured to implement a mesh network for transmission of data.

Optionally, the device further comprises a cloud server configured to pre-cache credentials of one or more communication networks installed in the typical movement area in the communication module.

Optionally, the controller is configured to communicate a last location, as determined by either the first sensor or the second sensor, via the communication module if the connectivity with a communication network begins to deteriorate.

Optionally, the controller is configured to optimize wake-up times for one or more of the first sensor and the second sensor based on the typical movement schedule.

Embodiments of the present disclosure substantially eliminate or at least partially address the aforementioned problems in the prior art, and enables reliable, efficient and cost effective aforesaid methods.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
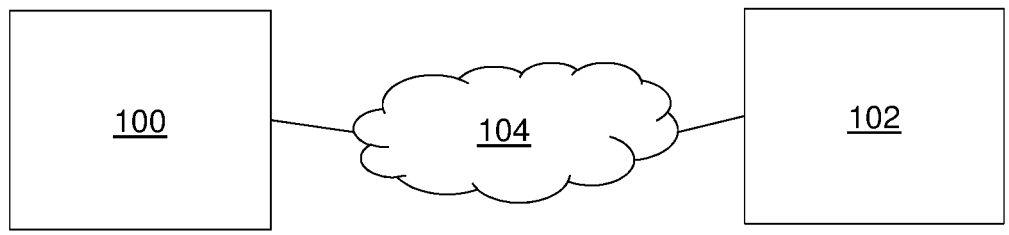
FIG. 1 is an exemplary block diagram of a device in communication with a cloud server, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of deriving a location comprising:

measuring, with a first sensor, movement as a function of time during a first period of time;

deriving a typical movement area and a typical movement schedule using the measured movement as a function of time during the first period of time;

measuring, with the first sensor, movement as a function of time during a second period of time, wherein the second period of time corresponds to the first period of time;

comparing the measured movement as a function of time during the second period of time with the derived typical movement area and the typical movement schedule; and initiating a second sensor to determine a current location if the measured movement as a function of time during the second period of time is not within the derived typical movement area or not aligned with the derived typical movement schedule based on the comparison.

In another aspect, an embodiment of the present disclosure provides a device for deriving a location comprising:

a first sensor configured to measure movement as a function of time during a first period of time and a second period of time, wherein the second period of time corresponds to the first period of time;

a second sensor configured to determine location; and a controller configured to:

derive a typical movement area and a typical movement schedule using the measured movement as a function of time during the first period of time;

compare the measured movement as a function of time during the second period of time with the derived typical movement area and the typical movement schedule; and initiate the second sensor to determine a current location if the measured movement as a function of time during the second period of time is not within the derived typical movement area or not aligned with the derived typical movement schedule based on the comparison.

The present disclosure provides the aforesaid method of deriving location of a battery-operated electronic device, such as a smartphone or an electronic tag, without unduly using battery power from such a device. In general, the present method utilizes low-power techniques for determining and reporting location for relatively frequent measurements as much as possible, and even those measurements are not required to be made (or needed less frequently) when a user is determined to be following a regular routine, i.e. a typical movement area and a typical movement schedule. Techniques that require more power, such as GPS for determining more accurate location, are reserved for particular situations in which the user has deviated from the regular routine, i.e. when not within the derived typical movement area or not aligned with the derived typical movement schedule. The aforesaid method substantially reduces the battery consumption of the electronic device, thus allowing to reduce the battery size and thereby making the device more portable, and/or eliminate the need to frequently charge the electronic device.

As defined herein, the term "location" refers to a geographical location where a device may be physically present at any particular instant of time. The term "location" is used to refer to a geographical location, such as a longitude/latitude combination, landmark or a street address. The term "location" is also used within this specification in reference to a physical location associated with a user, such as a "home," "office" and the like. The terms "location" and "position" have often been used interchangeably in the present disclosure.

Throughout the present disclosure, the term "device" generally refers to a portable wireless communication and processing equipment including at least one processor, memory elements, and at least one transceiver (or pair of a transmitter and a receiver) configured to wirelessly communicate data. Examples of the device include, but are not limited to, a smart phone, a tablet, a PDA, an electronic token or tag, etc. The device is intended to include all wireless communication devices which are capable of communication with a server, such as via the Internet, Wi-Fi, or other network, and regardless of whether satellite signal reception, assistance data reception, and/or position-related processing occurs at the device, at a server, or at another device associated with the network. Herein, the device also intended to include devices which communicate with a personal navigation device, such as by short-range wireless, infrared, wire line connection, or other connection regardless of whether satellite signal reception, assistance data reception, and/or position-related processing occurs at the device or at the said personal navigation device. Any operable combination of the above are also considered as the "device" in the present context.

In the present disclosure, the device is a battery-operated electronic communication device which is configured to determine its current location. The device includes a first sensor and a second sensor, both of which are capable of deriving current location of the device independent of each other. In particular, the first sensor is a low-power consumption sensor which is configured to derive location indirectly, and the second sensor is a comparatively high-power consumption sensor which uses direct approach for determining location. In present embodiments, the first sensor is configured to implement one or more of Bluetooth, Bluetooth Low Energy (BLE) and Wi-Fi techniques for measuring movement, whereas the second sensor is configured to implement on one or more of mobile networks or satellite based navigation techniques for measuring movement. Herein, the satellite based navigation techniques comprise one or more of Global Positioning System (GPS), Global Navigation Satellite System (GLONASS), Galileo, BeiDou Navigation Satellite System and Indian Regional Navigation Satellite System (IRNSS).

The device also includes a communication module which may be a transceiver (or pair of a transmitter and a receiver) for transmitting and receiving data communication. The communication module is implemented in conjunction with various communication networks such as a wireless wide area network (WWAN), a wireless local area network (WLAN), a wireless personal area network (WPAN), a Low Power Wide Area Network (LPWA), and so on. The terms "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), CDMA), and so on. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). A WLAN may be an IEEE 802.11x network (generally implemented by Wi-Fi networks), and a WPAN may be a Bluetooth network, an IEEE 802.15x, or some other type of network. An LPWA may be a Narrowband-IoT (NB-IoT) or an Enhanced Machine-type Connection (eMTC) or similar. The techniques may also be implemented in conjunction with any combination of WWAN, WLAN, LPWA and/or WPAN.

The device further includes a controller which may be any processing device, system or part thereof that controls at least one operation of the device. The controller may be implemented in hardware, firmware or software, or some combination of at least two of the same. It should be noted that the functionality associated with any particular controller may be centralized or distributed, whether locally or remotely. In the present examples, the controller may further incorporate neural networks. The controller may be a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. Further, the memory may include one or more non-transitory computer-readable storage media that can be read or accessed by other components in the device. The memory may be any computer-readable storage media, including volatile and/or non-volatile storage components, such as optical, magnetic, organic or other memory or disc storage, which can be integrated in whole or in part with the device. In some examples, the memory may be implemented using a single physical device (e.g., one optical, magnetic, organic or other memory or disc storage unit), while in other embodiments, the memory may be implemented using two or more physical devices.

In the present disclosure, the method of deriving the location comprises measuring, with the first sensor, movement as a function of time during a first period of time. Herein, the "first period of time" may be time-periods including one of many slots of time in a typical day of a user. The first sensor may keep track of the time and location of the device during the first period of time over a course of several days, and learn the user's movement patterns via learning techniques; for example, using artificial intelligence and/or by implementation of neural network, and the like. The locations and times may correspond to patterns, such as daily work hours, times typically at home, weekly gatherings, etc. For example, the first sensor may identify that the device is regularly at a location associated with office between 8:30 A.M. and 5:30 P.M. Monday through Friday, and regularly at a location associated with home between 6:00 P.M. and 8:00 A.M. Sunday through Thursday.

Alternatively, or additionally, the method may comprise receiving information directly from the user related to his/her routine, via a user interface. For example, the received information may include whether the user is regularly at home after 6:00 P.M. Sunday-Thursday until approximately 8:00 A.M. on the following days, and is regularly at work from 8:30 A.M. to 5:30 P.M. on Monday-Friday. Herein, the user interface may be provided by the device, for example a touch-screen on the device itself; or may be provided by a separate equipment in communication with the device. It may be appreciated that the information could be asked to the user in the form of a questionnaire or the like. In other embodiments, rather than prompting the user via a user interface, the device may retrieve dates and times that a user is known to be at a location from calendar data, such as from a calendar application associated with a smartphone of the user.

The method further comprises deriving a typical movement area and a typical movement schedule using the measured movement as a function of time during the first period of time. In any of the above examples, the controller in the device may identify one or more times during which the device will not change locations, and set the location change status at those times to reflect that the device is not changing locations. For example, it may be determined that the device is usually at the same location, i.e. at home between 6:00 P.M. to 8:00 A.M. on the following days on Sunday-Thursday, and is regularly at office from 8:30 A.M. to 5:30 P.M. on Monday-Friday. Further, in the above examples, the first sensor may identify one or more times during which the device changes locations; for example, it may be determined that the user is usually travelling, carrying the device, from home to office between 8:00 A.M. to 8:30 A.M., and from office to home between 5:30 P.M. to 6:00 P.M. on Monday-Friday. It may be understood that such information can be employed to determine the typical movement area and the typical movement schedule.

As discussed, the first sensor is configured to implement one or more of Bluetooth, Bluetooth Low Energy (BLE), an accelerometer, a gyroscope and Wi-Fi techniques for measuring movement. Herein, the first sensor may use credentials (i.e. login information including username, password, etc.) of communication networks installed in the typical movement area, such as Wi-Fi access-points in the home and the office, as saved in the memory thereof. Such credentials may be provided by the user itself. For example, if the device is a smartphone, the user may use available keypad of the smartphone for entering credentials information. Alternatively, if the device is an electronic tag without any text input means, the device may pair up with the smartphone of the user to allow the user to enter credential information in the smartphone and thereafter receive such information from the smartphone. It may be understood that the device can also use open Wi-Fi networks.

Subsequently, the controller may use the information available from the metadata of the access-points ("communication network") to derive the location of the corresponding access-points, and therefrom current location of the device by co-relating the available information about the Wi-Fi access point. For example, there may be a particular SSID (Service Set Identifier) for the home Wi-Fi network, and whenever the device connects to Wi-Fi network with that particular SSID, the controller may estimate the current location to be "Home," or nearby home, and thus derive the location of the device. This is further helpful that the first sensor could directly inform the user of location to be "Home" (which may be pre-labelled) rather than some obscure location co-ordinates. In such case, the first sensor may not even need to determine location or may reduce frequency of determination of location, as long as the device is connected to the known communication network, thus saving huge amount of battery charge in regular operations of the device.

Optionally, the method further comprises pre-caching of credentials, by a cloud server, of one or more communication networks installed in the typical movement area, in the communication module. Herein, the cloud server may be a third-party location services company or the like which may have information about multiple public access-points scattered in common public places around a city. The first sensor may download credentials information of communication networks installed in the usual path taken by the user while travelling from home to office, and vice-versa, to connect to the communication networks therein. Thereafter, the first sensor could estimate the current location of the device using the metadata of the connected communication network. In some examples, the first sensor may not even need to connect to the communication network, and may only scan an area for available communication networks and use that information to guesstimate the current location of the device, and thus derive the location of the device.

In some examples, when the device is located close to a trusted device which has credentials information for an available Wi-Fi network; in such case, the controller is configured to receive the credentials information from the trusted device and store the credentials information in the memory of the device. Therefore, if the device moves on average between five different locations (home, school, office, club and relative destinations), the device automatically learns these sensor landscape and download or extract Wi-Fi access-points information and is, thus, able to communicate freely in all these destinations. This may be particularly useful in case of the device with no connection with mobile networks. In present examples, the device and the cloud sever may store combinations of relevant locations and associated credentials, and this information is updated and refined from multiple devices, each time the sensor environment changes.

Alternatively, or additionally, the first sensor may use broadcast information of communication networks to which the device may already be connected to, such as a GSM mobile network for calling purposes in case of the device being a smartphone, and use the broadcast information to derive the location of the device.

In one or more embodiments, the method further comprises implementing a mesh network by the first sensor for measuring movement. Indeed, Bluetooth or Wi-Fi communication means may be used to implement the mesh network. In one example, the device may be in communication with other user's devices ("user devices"). The other user devices may include a smartphone of the user which may already be constantly or regularly monitoring location of the user for providing location-based services to the user. In such case, the device may add the other user device as a trusted device, and use the location data from the other user device by using low-power communication techniques, like Bluetooth or Bluetooth Low Energy, or even direct Wi-Fi transfer (if the Bluetooth connection may not be available); even though the other user device may be utilizing high-power consuming techniques, like GPS, for determining location, and thereby the present device may receive more accurate location data without consuming large amount of battery power. In other examples, the device may be in communication with other similar devices in the vicinity, which are part of a trusted devices mesh network, for example other devices provided by same organization or manufacturer following similar standards and protocols. Herein, one or few of the other devices may determine location, for example, utilizing the second sensor by using GPS technique, and the present device may receive location data from one of those other devices, thus receiving more accurate location data without consuming large amount of battery power. The present device may further improve location accuracy using for instance triangulation or other means.

In one or more examples, the device may further transmit the location data to the cloud server for storage and management thereof. Specifically, the first sensor may transmit data related to the typical movement area and the typical movement schedule, as determined by analysis of the location data. In some examples, the device may directly communicate the location data to the cloud server, and the cloud server, at its end, may process the location data to derive the typical movement area and the typical movement schedule.

In one or more embodiments, the method comprises implementing one or more of General Packet Radio Service (GPRS), Long-Term Evolution (LTE), Wi-Fi, Low Power Wide Area Network (LPWA) and Satellite Internet access by the communication module for transmission of data. In the present examples, the device may preferably implement Wi-Fi networks for transmission of data due to its comparatively lower power consumption as compared to mobile networks; however, during unavailability of a known Wi-Fi network, the device may resort to using one or more of the other available networks. It may be appreciated that the device may use the credentials of various Wi-Fi as pre-cached by the cloud server for connecting to one of the available Wi-Fi networks for transmission of data.

In some examples, if multiple devices are within the coverage area of the same Wi-Fi network, the devices combine their data with Bluetooth mesh network and only one device transmits their data forward. This way, the devices can independently communicate, for example, up to miles of distances (without the need of using high-power consuming connections) as far as the extended mesh network covers.

The method further comprises measuring, with the first sensor, movement as a function of time during a second period of time, wherein the second period of time corresponds to the first period of time. That is, the "second period of time" may include same time-periods corresponding to the number of slots of time in a day as used earlier for the first period of time. The one or more techniques employed for measuring movement during the second period of time (i.e. locations and corresponding times) are same as employed for measuring movement during the first period of time (described above). For instance, in a first example, it may be determined that on a Wednesday, the device is located at office between 8:30 A.M. to 5:30 P.M. Further, in a second example, it may be determined that on a Thursday, the device is located at office between 8:30 A.M. to 4:30 P.M., but neither at office nor home between 4:30 P.M. to 5:30 P.M.

The method further comprises comparing the measured movement as a function of time during the second period of time with the derived typical movement area and the typical movement schedule. As discussed in the example earlier, the typical movement area and the typical movement schedule of the device is being located at office between 8:30 A.M. to 5:30 P.M. Now in case of the first example of Wednesday as discussed in the preceding paragraph, the measured movement as a function of time during the second period of time which is considered to be between 4:30 P.M. to 5:30 P.M. matches with the derived typical movement area and the typical movement schedule. However, in case of the second example of Thursday as discussed in the preceding paragraph, the measured movement as a function of time during the second period of time which is considered to be between 4:30 P.M. to 5:30 P.M. does not match with the derived typical movement area and the typical movement schedule.

It may be noted that in case of the measured movement as a function of time during the second period of time is within the derived typical movement area and aligned with the derived typical movement schedule based on the comparison, as in the first example above, then the controller may suspend or limit or otherwise limit access to or use of the first sensor. That is, the first sensor may not need to transmit any location data to the cloud server during that time period in which the device is at a known location for a specific duration of time. Further, the second sensor may not even be needed to be woken-up in such case. In such case, the cloud server would assume that the current location of the device would be same as the usual location of the device as per the typical movement area and the typical movement schedule, and may broadcast that location to known contacts of the user with the required permissions to access the location of the user at any given instant of time.

The method further comprises initiating the second sensor to determine a current location if the measured movement as a function of time during the second period of time is not within the derived typical movement area or not aligned with the derived typical movement schedule based on the comparison. That is, in case of the measured movement as a function of time during the second period of time is not within the derived typical movement area or not aligned with the derived typical movement schedule based on the comparison, as in the second example above, then the controller of the device may switch to the second sensor for determining the location, even if comes at a cost of larger battery consumption. Herein, as discussed above, the second sensor may implement on one or more of mobile networks, such as GSM, CDMA, LTE, etc. or satellite based navigation techniques, such as one or more of Global Positioning System (GPS), Global Navigation Satellite System (GLONASS), Galileo, BeiDou Navigation Satellite System and Indian Regional Navigation Satellite System (IRNSS), for measuring movement. It may be understood that the second sensor is implemented for measuring movement as a function of time during the second period of time if the measured movement using the first sensor is not within the derived typical movement area or not aligned with the derived typical movement schedule based on the comparison.

The method further comprises at least one of: communicating the current location to a cloud server, alerting a user and sending an alert notification to a third party using a communication module, if the measured movement as a function of time during the second period of time is not within the derived typical movement area or not aligned with the derived typical movement schedule based on the comparison. That is, when the second sensor may determine the current location of the device, the communication module communicates and updates the current location of the device in the cloud server. The device may further include an alerting unit, such as a motor to vibrate the device, to alert a user when the user is not within the derived typical movement area or not aligned with the derived typical movement schedule. Therefore, in case of the device being an electronic tag to be secured to a child, as and when the child may step outside of the house other than permitted or usual times (e.g., school time), the child (and/or the parent as per configured settings) may get a physical feedback to warn the child that he/she is out of set range, as well as the parent may receive notification that the child may be stepping outside so that the parent could take required pre-emptive action.

The method further comprises implementing one or more of General Packet Radio Service (GPRS), Long-Term Evolution (LTE), Low Power Wide Area Network (LPWA), Wi-Fi and Satellite Internet access by the communication module for transmission of data. As discussed, the communication module may implement a wireless wide area network (WWAN), a wireless local area network (WLAN), a wireless personal area network (WPAN), and so on. The terms "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), CDMA), and so on. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). A WLAN may be an IEEE 802.11x network (generally implemented by Wi-Fi networks), and a WPAN may be a Bluetooth network, an IEEE 802.15x, or some other type of network. An LPWA may be a Narrowband-loT (NB-IoT) or an Enhanced Machine-type Connection (eMTC) or similar. The techniques may also be implemented in conjunction with any combination of WWAN, LPWA, WLAN and/or WPAN.

In one or more embodiments, the method further comprises implementing a mesh network by the communication module for transmission of data. In one example, the device may be in communication with other user's devices (or "user devices"). The other user devices may include a smartphone of the user which may have Internet access using mobile data. In such case, the device may add the other user device as a trusted device, and use the mobile data of the other user device by using low-power communication techniques, like Bluetooth and Bluetooth Low Energy, or even direct Wi-Fi transfer (if the Bluetooth connection may not be available) for transmission of data. In other examples, the device may be in communication with other similar devices in the vicinity which are part of a trusted devices mesh network, for example other devices provided by same organization following similar standards and protocols. Herein, one or few of the other devices may have Internet access, for example, utilizing e-SIM technology, connection to Wi-Fi network, and the like, and the present device may use Internet access from one of those other devices for transmission of data without consuming large amount of battery power. In some examples, if multiple devices are within the coverage area of the same Wi-Fi network, the present device combine its data with other devices using Bluetooth and only one of the other devices transmits all of the collated data forward which further saves battery charge therein.

In one or more embodiments, the method further comprises communicating a last location, as determined by either the first sensor or the second sensor, via the communication module if the connectivity with a communication network begins to deteriorate. It may be appreciated that this being done so to at least transmit a last known location of the device to the cloud server, before the device may possibly do not have access to any of the communication networks. For this purpose, the communication module may check for strength of signal of the connected communication network. If the strength of the communication network falls below a predefined threshold, say 20% of overall signal value, the communication module may transmit the last determined location immediately, as determined by either the first sensor or the second sensor. In some examples, the communication module may only transmit the last known location, if the controller identifies that the connected communication network is a last known communication network along a path that the user is traversing. In other examples, the communication module may not transmit the last known location, if the controller identifies that the path that the user is traversing is a known path and there would be another known communication network in the path coming afterwards.

Optionally, the method further comprises optimizing wake-up times for one or more of the first sensor and the second sensor based on the typical movement schedule. For example, the controller may only initiate the first sensor around a time when there is going to be a change in event in the typical movement schedule. For example, when the user arrives home at 6:00 P.M. on a given weekday, the controller may make an assumption that the user is going to stay at home till 8:00 A.M. next morning (unless there is some event marked in the user's calendar). In such case, the controller may switch off the first sensor after 6:00 P.M. and would only switch the first sensor back on just before 8:00 A.M. when the user is supposed to leave for office. In other example, the controller may not completely switch off the first sensor, but may reduce the frequency of location determination thereby. In yet other examples, the controller may only switch off or reduce the frequency of location determination from midnight to early morning, when the user is likely asleep, and thus there may not be need of determining location. In case of multiple trusted devices in a mesh network, the devices are time-synchronized to minimize waking time in intercommunication. Herein, the time information can be obtained from application, GPS signal, or as an extension of communication between devices.

According to an embodiment of the present disclosure, the device may be in the form of an electronic tag which can be used for tracking and locating objects. As discussed, the device includes two fully autonomous sensors, a first sensor and a second sensor. The first sensor may implement communication protocols like "Bluetooth 5" and Wi-Fi. The second sensor may implement communication protocols or location modules like LPWA (e.g. NB-IoT/LTE CAT M1), eSIM card, GPS, etc. The device may also include a communication module, a controller with a flash memory and a processor, an accelerometer, a motor for providing vibration feedback and one physical button. The device may further include a replaceable Li-ion battery. In some examples, the device may include two batteries, a smaller battery for the first sensor and a larger battery for the second sensor. The device may be watertight and impact resistant.

In an embodiment, the device may be in the form of a circular or rectangular unit, with two parts which may fold onto each other to provide the device a compact shape. The parts may be connected to each other by strong flexible coupling so that the extremities of the device are long and thin, and parts could fold over each other, with a smaller overall surface area, but the device is thicker. The device may be partially folded, and may look like button so it is suitable for example use in garments. For this purpose, the device may be soft on the surface and may be, for example, fabric or rubber so that it does not feel different than the garment when disposed thereon. Herein, the device may be employed, e.g., for tracking of an inventory of garments from the factory to distribution supply chain.

In such examples, on single short press of the button, the device vibrates steadily according to the amount of battery remaining. For example, the definable time of 0.5-3 seconds of lightening in colour (using an LED light present in eth device) corresponds to 10% to 100% of the coil power. In some examples, the corresponding information could be obtained on a separate user interface on a user's smartphone.

In one use-case, the first sensor collects location information when the device is moving at one instant in a familiar area and then put the first sensor in a low power state. The location information is transmitted to the cloud sever and other trusted devices via the communication module for better usability. Herein, it may be appreciated that the device can be operated differently in different uses based on the user's typical movement area. When the device has stopped for a longer time than usual at any particular location, as determined by the accelerometer, the first or the second sensor are woken-up and location information is collected again based on whether any of the available communication networks in the area is known or not, and the sensor(s) may again be put into a low power state. At such instant, the user can ask the user "whether the device is at home/school/office?" Further the information about movement areas and movement times is collected in this learning phase, and later used to derive typical movement area and typical movement schedule. This information is collected both for the application (independent use) and the cloud server, anonymously and in an encrypted manner. In addition, the device allows to implement geo-fence type functions that can be implemented based on the data from the first sensor and/or the second sensor, i.e. sensory and not just based on GPS, making them much less streamlined and reliable, especially in indoors.

In one example, if the device does not move (as determined by the accelerometer) for x seconds in y seconds, then a motion sensor (as incorporated in the device) may be switched on. When the device is then switched on, an alarm message can be transmitted to the user's smartphone or the like by SMS (a plain-language placeholder using the built-in spatial database), alarm notification, e-mail, or by using a telephone subscription or cloud service. In one exemplary implementation, the device could be left in a car, bag, or other important location to get an alert, if it is touched or moved.

In yet other example, if the device remains in motion (as determined by accelerometer) for more than x seconds in y seconds, the geo-fence function may be switched on and the device is made to actively report its location. Geo-fences can be defined in terms of Global Positioning System (GPS) coordinates (e.g., latitude and longitude) combined with a radius measured in meters or feet, for example. Alternatively, geo-fences can also be defined according a series of GPS coordinates defining a bounding box. In yet other examples, a geo-fence can be any geometric shape defined by a mathematical formula and anchored by a GPS coordinate. In certain examples, location data points can also be used to detect movement trajectories, which can be used to refine detection of presence within geo-fences representing a physical location (e.g., user's home). The geo-fence may include a security zone which may be defined based on a predetermined radius of a user's home, for example. If the device moves out of the geo-fence, the second sensor is activated to constantly monitor the location data as determined by any available technique and communicate the location data using any available communication network, even at the cost of battery. In addition, the wearer of the device, so pre-selected by the cloud service or telephony application, will receive haptic feedback by the motor in the device (vibration, for example, periodically at 30 s intervals which is editable) all the time when the device is out of the security zone and terminates the vibration when the device is back again in the security zone.

Further, in some examples, when two or more devices that are pre-defined as trusted devices' defined in the cloud server and which are Bluetooth/Wi-Fi range apart, two consecutive presses on the button can be used to activate group mode. Then, the cloud server or the mobile application can be used to set the distance within which the group members must be at any given time, or otherwise an alarm will be activated as in the above-mentioned alarm mode or haptic signalling (for example, periodically at 15 s intervals, which is editable) until the group members are back together. The mutual distance can be based on Bluetooth and Wi-Fi, LPWA cells, or GPS locations. This function can be used internally as an example to ensure that everyone remains within a safe distance from each other (e.g. parents with kids in amusement parks, hiking, outdoor events, etc.).

In some examples, the device may be configured to provide more detailed information haptically than individual vibrations. The device can announce in advance the codes specified in the service (e.g., Morse code) in which direction the user must travel to reach the group or security zone again. For example, P (North) could be expressed haptically as " . . . " and the like. The direction may be absolute like the aforementioned or relative to the travelled direction; e.g., Turn left (for example, short vibration), right (for example, double blind), move forward/backward (for example, short and long beating), etc.

The described features of group mode, security zone, and motion sensor can also be activated at the same time in the device. The device may have various power saving profiles which may reduce battery consumption depending on how often and many less times the device uses more power-consuming communication methods (LPWA) instead of just Bluetooth. Primarily, the device always tries to communicate through the most streamlined Bluetooth connection either directly or through an extended mesh network utilizing several different trusted devices. If this fails, only then LPWA connections are enabled. In some examples, the device can be activated with a so-called "emergency action," whereby the device will use all possible communication modes even at the expense of battery life, if required. Such emergency action may be activated upon a preconfigured pattern of pressing of the button.

Herein, the cloud server includes the ability to customize the functions of the device, such as switching between different types of push buttons, adding new functions such as activating different commands or completely controlling and merging other BluetoothWi-Fi devices. Various settings, such as periodic vibration frequencies in different situations (e.g., Bluetooth/Wi-Fi range overrun), security range defaults or alarm modes can be changed. For example, when a device is separated from a group, the device could generate a haptic alarm or can only send alert notification via a cloud server (e.g., to the addresses mentioned separately which can also be defined). The cloud server can be used and the settings can be changed either by browser or by telephony. By default, the cloud server provides the device with values that are best suited for general use.

In some examples, the device can have additional functions to be used for entertainment or health-related applications, for example with easy-to-access options such as display, alarm, microphone, loudspeaker, light, vibration and various sensors (e.g. temperature, pressure, humidity, pulse, step, etc.) depending on the case. For example, if the temperature sensor indicates temperature falls below a certain predetermined limit value and the device does not move within a certain time, the device will send an alarm. Such functions could be added to the device using hardware and firmware additions, as could be contemplated by a person skilled in the art.

In the present embodiments, the device is based on the idea of "Internet of Things (loT) as a user-friendly, self-styled, standalone product for deriving location, with a superior combination of cost-to-size, battery life, and connectivity. The present device can be utilized to locate objects, vehicles, people or pet animals, for example. The device of the present embodiments is particularly suited for providing to a child, an elderly person, a pet animal, or any other mobile subject for which a certain security area is directly activated and the user of the device haptically observes the security clearance in order to take corrective action.

When the present device has been used for a long time and have learned enough about user's most common routes, duration, and targets, the device can intelligently use the power saving features to check for the way to have minimum power consumption while ensuring that the sensors are available at the required time. For example, between two destinations A and B, when there are certain low-power Bluetooth sensors or comparatively high-power Wi-Fi base stations, the waking times of the sensors can be optimized for connectivity with low-power Bluetooth sensors.

DETAILED DESCRIPTION OF THE DRAWINGS

Figure 2:
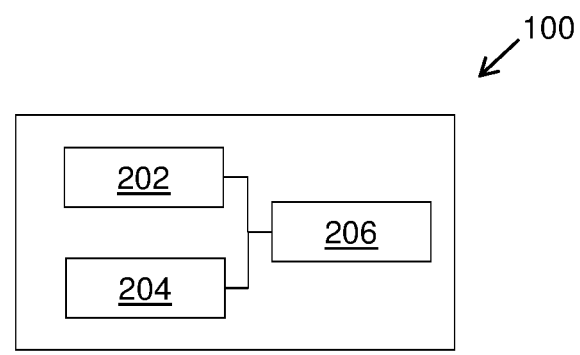
FIG. 2 is an exemplary block diagram of the device (as illustrated in FIG. 1), in accordance with an embodiment of the present disclosure.

Referring to FIG. 1, illustrated is a block diagram showing a device 100 in communication with a cloud server 102, in accordance with an embodiment of the present disclosure. The device 100 is in communication with the cloud server 102 using a communication network 104. Referring to FIG. 2, illustrated is a block diagram of the device 100. As illustrated, the device 100 includes two sensors, namely a first sensor 202 and a second sensor 204. In the device 100, the first sensor 202 implements one or more of Bluetooth, Bluetooth Low Energy (BLE), Low Power Wide Area (LPWA) and Wi-Fi standards techniques for measuring movement, and the second sensor 204 implements on one or more of mobile networks or satellite based navigation techniques for measuring movement. The device 100 further includes a controller 206 which is disposed in communication with both the first sensor 202 and the second sensor 204.

It may be understood by a person skilled in the art that FIGS. 1-2 provide simplified arrangements for implementation of the device 100 for sake of clarity of the present disclosure. It will be appreciated that FIGS. 1-2 are merely exemplary, which should not unduly limit the scope of the claims herein. The person skilled in the art will recognize many variations, alternatives, and modifications of embodiments of the present disclosure may be possible.

Figure 3:
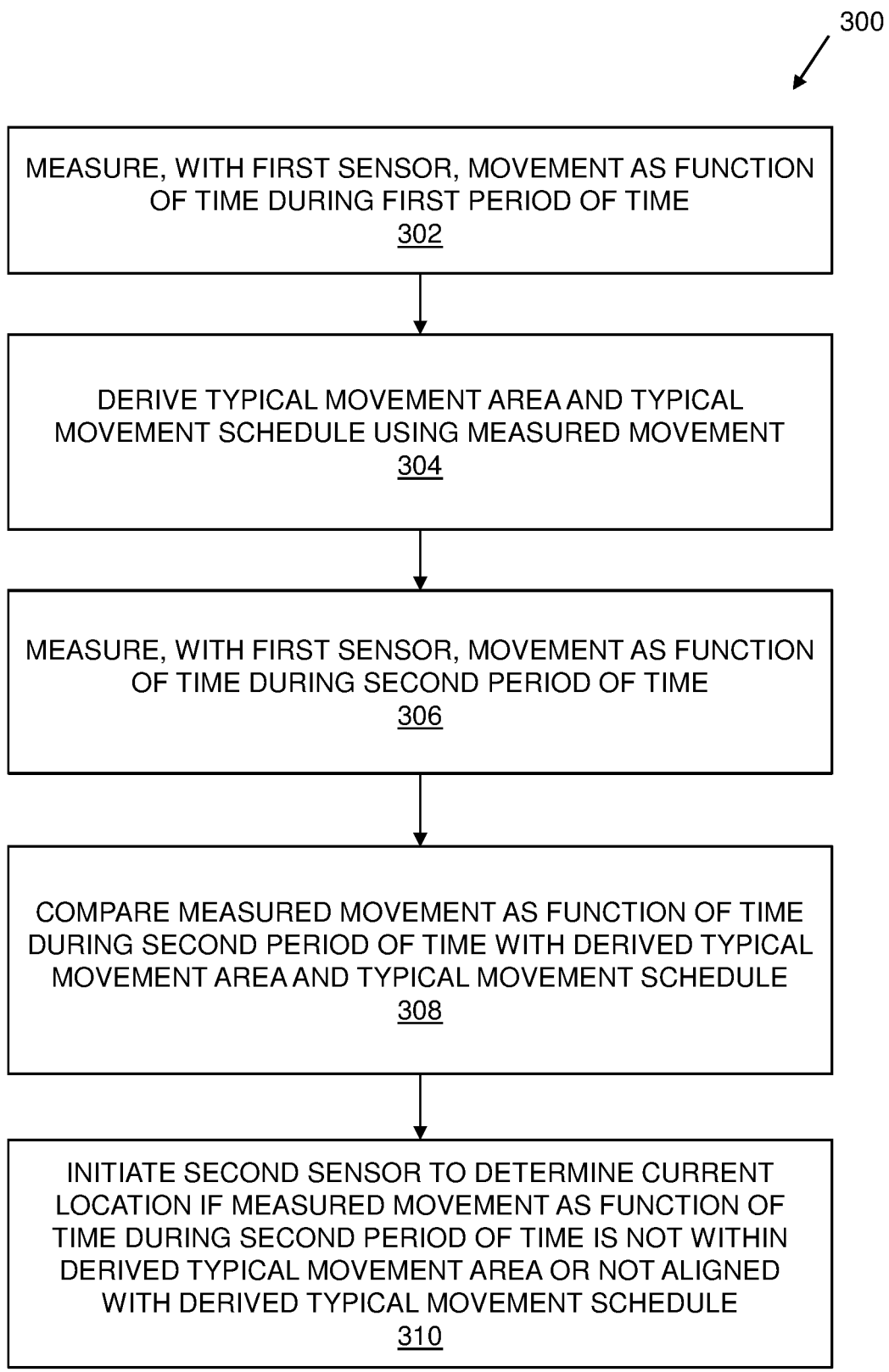
FIG. 3 illustrates steps of a method of deriving a location, in accordance with an embodiment of the present disclosure.

Referring to FIG. 3, illustrated are steps of a method 300 of deriving a location, in accordance with an embodiment of the present disclosure. At step 302, movement as a function of time during a first period of time is measured by the first sensor 202. At step 304, a typical movement area and a typical movement schedule is derived using the measured movement as a function of time during the first period of time. At step 306, movement as a function of time during a second period of time is measured by the first sensor 202, wherein the second period of time corresponds to the first period of time. At step 308, the measured movement as a function of time during the second period of time is compared with the derived typical movement area and the typical movement schedule. At step 310, the second sensor 204 is initiated to determine a current location if the measured movement as a function of time during the second period of time is not within the derived typical movement area or not aligned with the derived typical movement schedule based on the comparison.

The steps 302 to 310 are only illustrative and other alternatives can also be provided where one or more steps are added, one or more steps are removed, or one or more steps are provided in a different sequence without departing from the scope of the claims herein.

Figure 4A:
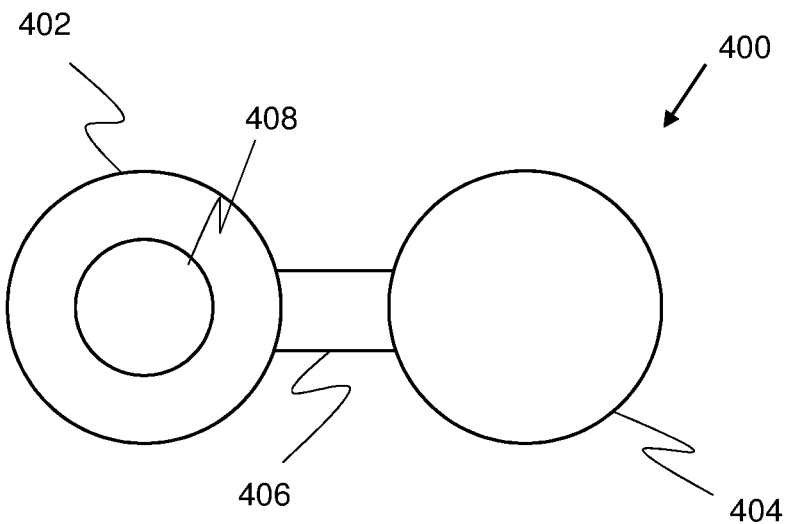
FIGS. 4A-4B and 5A-5B are exemplary diagrammatic representations of the device (as illustrated in FIG. 1), in accordance with various embodiments of the present disclosure.
Figure 4B:
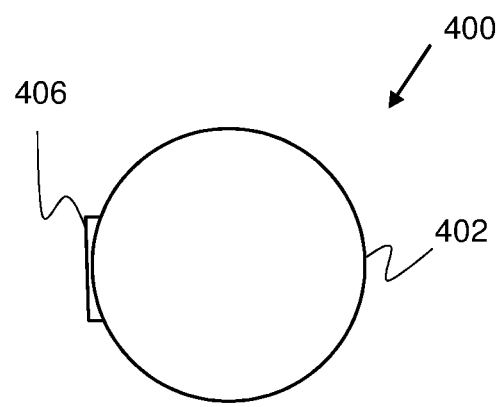
Figure 5A:
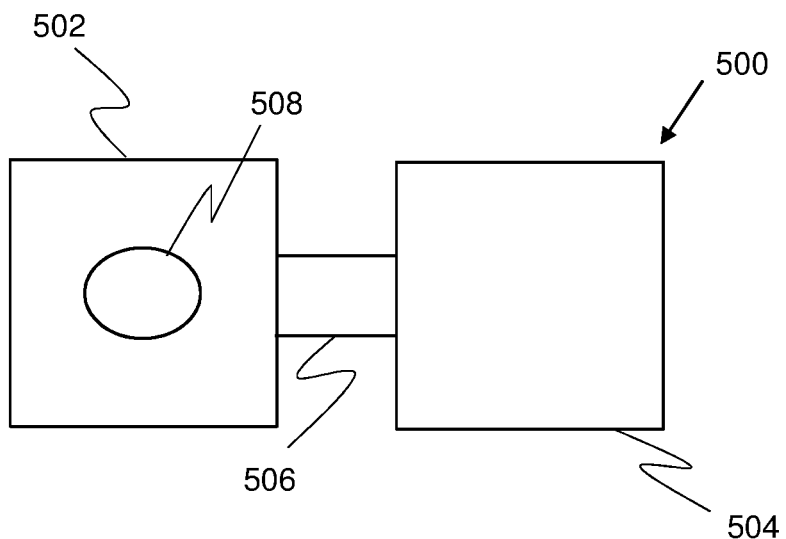
Figure 5B:
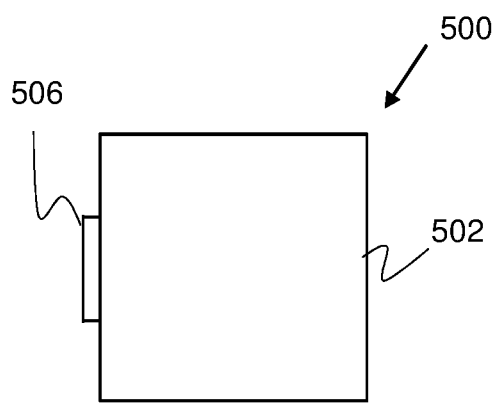

Referring to FIGS. 4A-4B, illustrated are diagrammatic representations of a device 400 in an open and folded position, respectively, in accordance with one embodiment of the present disclosure. The device 400 includes two parts, namely a first part 402 and a second part 404. The parts 402 and 404 are connected to each other by strong flexible coupling 406. Further, the device 400 includes a button 408 provided at inside of the first part 402. Referring to FIGS. 5A-4B, illustrated are diagrammatic representations of a device 500 in an open and folded position, respectively, in accordance with another embodiment of the present disclosure. The device 500 includes two parts, namely a first part 502 and a second part 504. The parts 502 and 504 are connected to each other by strong flexible coupling 506. Further, the device 500 includes a button 508 provided at inside of the first part 502.

Again, it may be understood by a person skilled in the art that FIGS. 4A-4B and FIGS. 5A-5B provide simplified arrangements for implementation of the device 100 for sake of clarity of the present disclosure. It will be appreciated that FIGS. 4A-4B and FIGS. 5A-5B are merely exemplary, which should not unduly limit the scope of the claims herein. The person skilled in the art will recognize many variations, alternatives, and modifications of embodiments of the present disclosure may be possible.

Figure 6A:
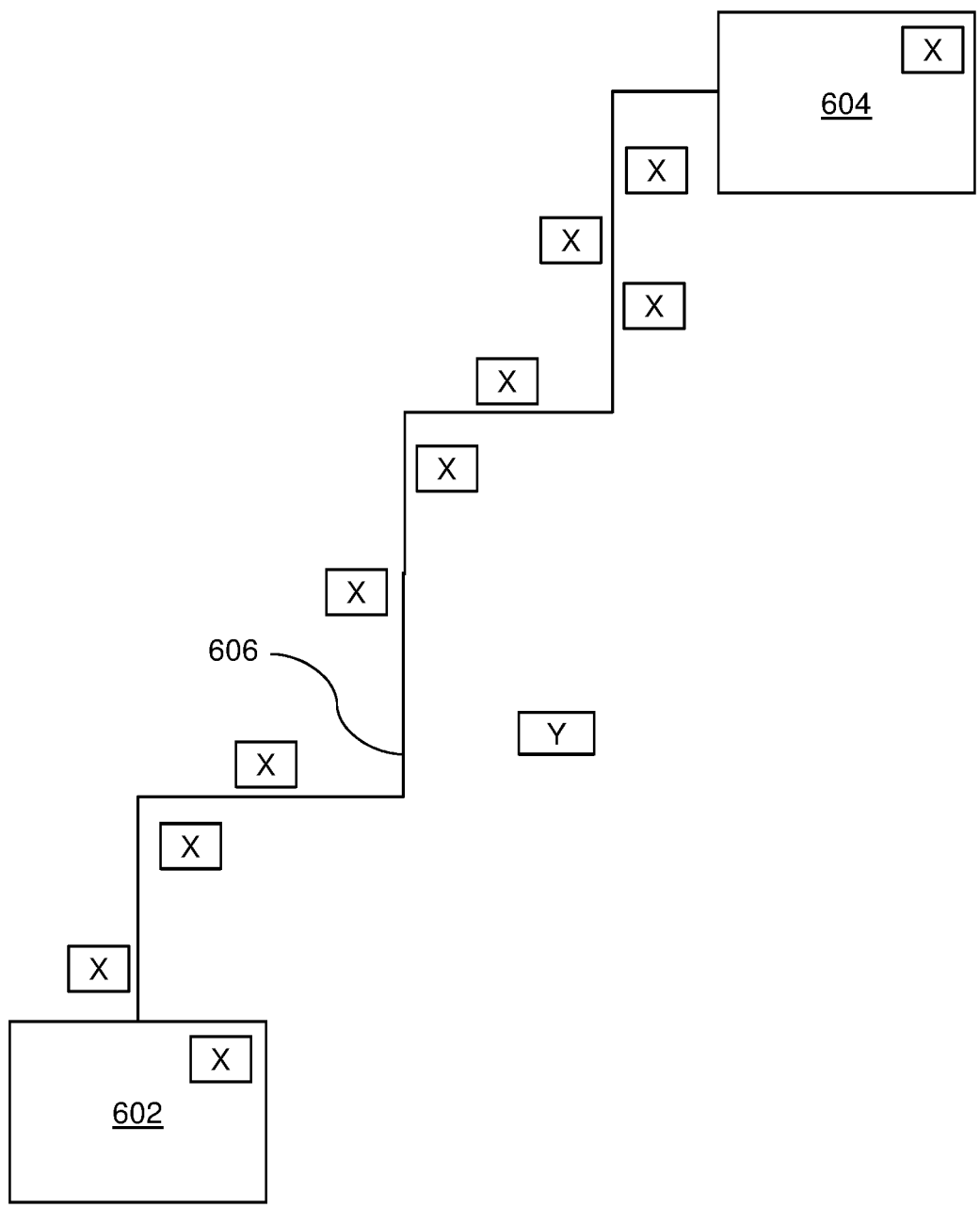
FIGS. 6A-6B are representations of typical movement area taken by the user while moving from home to office while traversing usual and unusual route respectively, in accordance with an embodiment of the present disclosure.

Referring to FIG. 6A, illustrates is a typical movement area taken by the user while moving from home to office. Herein, block 602 represents home of the user and block 604 represents office of the user. The path in solid lines represents the typical or usual path 606 taken by the user while travelling from the home 602 to the office 604. The various indications 'X' represents Wi-Fi access points (as communication networks) installed along the path 606, and 'Y' represents Wi-Fi access points installed away from the path 606. If the user continues to traverse on the path 606 during the corresponding typical movement schedule when the user is expected to take that path, the first sensor in the device (as illustrated in FIGS. 1-2) determines location intermediately at low frequency intervals, and/or the second sensor in the device is operated in low power or switched-off state as determined by preconfigured settings thereof.

Figure 6B:
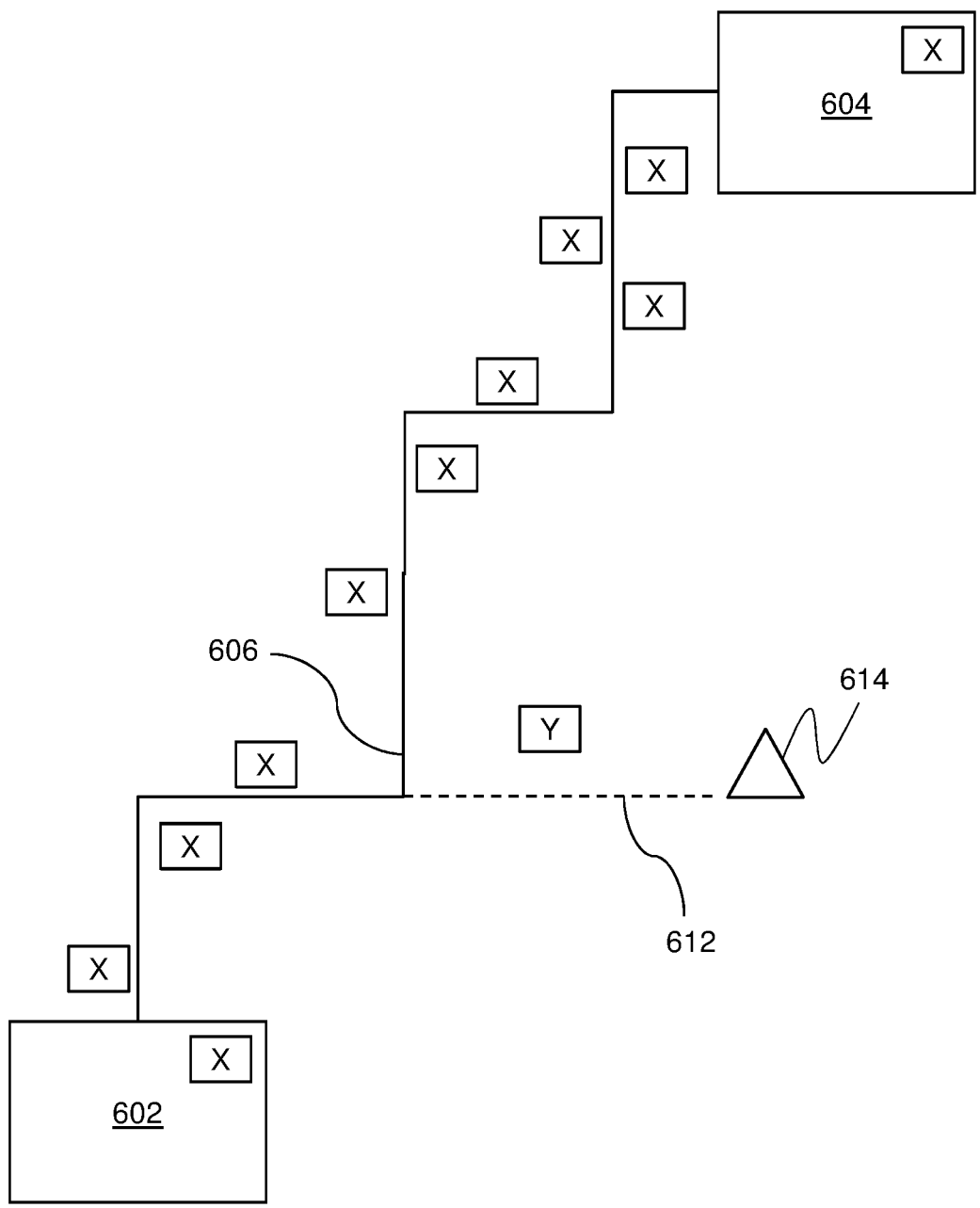

Referring to FIG. 6B, illustrates is same typical movement area (as illustrated in FIG. 6A) taken by the user while moving from home to office. Herein, again, block 602 represents home of the user and block 604 represents office of the user. The path in solid lines represents the typical or usual path 606 taken by the user while travelling from the home 602 to the office 604. The various indications 'X' represents Wi-Fi access points (as communication networks) installed along the path 606, and 'Y' represents Wi-Fi access points installed away from the path 606. The path in dashed lines represents a route 612 which is unusual, and is not within the typical movement area or not aligned with the typical movement schedule. In such case, the first sensor in the device (as illustrated in FIGS. 1-2) would find unexpected new Wi-Fi access points, such as Wi-Fi access point 'Y' which does not seem familiar Wi-Fi at familiar point of time. Further, in such case, the device will then determine location using the second sensor based on block 614 and communication the location to the cloud server. Further, the device, optionally, generates an alarm or an alert notification for the user.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of deriving a location comprising:
   deriving a typical movement area and a typical movement schedule from measurements made by a first sensor of a first device of movement as a function of time during a first period of time;
   measuring, with the first sensor, movement as a function of time during a second period of time, wherein the second period of time corresponds to the first period of time;
   comparing the measured movement as a function of time during the second period of time with the derived typical movement area and the typical movement schedule;
   suspending use of the first sensor upon determining that the measured movement as a function of time during the second period of time is within the derived typical movement area or aligned with the derived typical movement schedule based on the comparison;
   initiating a second sensor to determine a current location upon determining that the measured movement as a function of time during the second period of time is not within the derived typical movement area or not aligned with the derived typical movement schedule based on the comparison; and
   using separate batteries for the first and second sensors.

2. A method according to claim 1, wherein the first sensor implements one or more of an accelerometer, a gyroscope, Bluetooth, Bluetooth Low Energy (BLE) and Wi-Fi standards techniques for measuring movement, and the second sensor implements on one or more of mobile networks or satellite based navigation techniques for measuring movement.

3. A method according to claim 2, wherein the satellite based navigation techniques comprise one or more of Global Positioning System (GPS), Global Navigation Satellite System (GLONASS), Galileo, BeiDou Navigation Satellite System and Indian Regional Navigation Satellite System (IRNSS).

4. A method according to claim 1 further comprising:
   implementing by the first sensor, a mesh network of one or more second devices, the second devices having one or more first or second sensors; and
   using the one or more first or second sensors of the second devices for measuring movement.

5. A method according to claim 1 further comprising at least one of: communicating the current location to a cloud server, alerting a user and sending an alert notification to a third party using a communication module, if the measured movement as a function of time during the second period of time is not within the derived typical movement area or not aligned with the derived typical movement schedule based on the comparison.

6. A method according to claim 5 further comprising implementing one or more of General Packet Radio Service (GPRS), Long-Term Evolution (LTE), Low Power Wide Area network (LPWA), Wi-Fi and Satellite Internet access by the communication module for transmission of data.

7. A method according to claim 5 further comprising implementing by the communication module, a mesh network of a plurality of communication modules with one communication module configured for transmission of data from the plurality of communication modules to the cloud server.

8. A method according to claim 5 further comprising:
pre-caching of credentials, by the cloud server, of one or more communication networks installed in the typical movement area, in the communication module; and
using the pre-cached credentials to communicate with the one or more communication networks to enable the first sensor to measure the movement as a function of time during the first period of time.

9. A method according to claim 5 further comprising communicating a last location, as determined by either the first sensor or the second sensor, via the communication module if the connectivity with a communication network begins to deteriorate.

10. A method according to claim 5, comprising using the controller to implement a neural network to derive the typical movement area and the typical movement schedule using the measured movement as a function of time during the first period of time.

11. A method according to claim 5, wherein one or more trusted devices store credential information for one or more available Wi-Fi networks, the method comprising using the controller to receive the credential information and communicate with the one or more Wi-Fi networks to enable the first sensor to measure the movement as a function of time during the first period of time.

12. A method according to claim 1 further comprising optimizing wake-up times for one or more of the first sensor and the second sensor based on the typical movement schedule.

13. A first device for deriving a location comprising:
a first sensor configured to measure movement as a function of time during a first period of time and a second period of time, wherein the second period of time corresponds to the first period of time;
a second sensor configured to determine location; and
a controller configured to:
derive a typical movement area and a typical movement schedule using the movement measured by the first sensor as a function of time during the first period of time;
compare the measured movement as a function of time during the second period of time with the derived typical movement area and the typical movement schedule;
suspend use of the first sensor upon determining that the measured movement as a function of time during the second period of time is within the derived typical movement area or aligned with the derived typical movement schedule based on the comparison; and
initiate the second sensor to determine a current location if the measured movement as a function of time during the second period of time is not within the derived typical movement area or not aligned with the derived typical movement schedule based on the comparison;
the first device comprising separate batteries for the first and second sensors.

14. A device according to claim 13, wherein the first sensor is configured to implement one or more of an accelerometer, a gyroscope, Bluetooth, Bluetooth Low Energy (BLE), and Wi-Fi standards techniques for measuring movement, and the second sensor implements on one or more of mobile networks or satellite based navigation techniques for measuring movement.

15. A device according to claim 14, wherein the satellite based navigation techniques comprise one or more of Global Positioning System (GPS), Global Navigation Satellite System (GLONASS), Galileo, BeiDou Navigation Satellite System and Indian Regional Navigation Satellite System (IRNSS).

16. A device according to claim 13, wherein the first sensor is configured to:
implement a mesh network of one or more second devices, the second devices having one or more first or second sensors; and
use the one or more first or second sensors of the second devices for measuring movement.

17. A device according to claim 13 further comprising a communication module, wherein the controller is further configured to at least one of: communicate the current location to a cloud server, alert a user and send an alert notification to a third party using the communication module, if the measured movement as a function of time during the second period of time is not within the derived typical movement area or not aligned with the derived typical movement schedule based on the comparison.

18. A device according to claim 17, wherein the communication module is configured to implement one or more of General Packet Radio Service (GPRS), Long-Term Evolution (LTE), Low Power Wide Area Network (LPWA), Wi-Fi and Satellite Internet access for transmission of data.

19. A device according to claim 17, wherein the communication module is configured to implement a mesh network of a plurality of communication modules with one communication module configured for transmission of data to the cloud server.

20. A device according to claim 17 wherein the cloud server is configured to:
pre-cache credentials of one or more communication networks installed in the typical movement area in the communication module; and
use the pre-cached credentials to communicate with the one or more communication networks to enable the first sensor to measure the movement as a function of time during the first period of time.

21. A device according to claim 17, wherein the controller is configured to communicate a last location, as determined by either the first sensor or the second sensor, via the communication module if the connectivity with a communication network begins to deteriorate.

22. A device according to claim 17, wherein the controller is configured to:
receive from one or more trusted devices, credential information for one or more available Wi-Fi networks; and
use the credential information to communicate with the one or more Wi-Fi networks to enable the first sensor to measure the movement as a function of time during the first period of time.

23. A device according to claim 13, wherein the controller is configured to optimize wake-up times for one or more of the first sensor and the second sensor based on the typical movement schedule.

24. A device according to claim 13, wherein the controller is configured to implement a neural network to derive the typical movement area and the typical movement schedule using the measured movement as a function of time during the first period of time.

25. A device according to claim 13, comprising:
two parts that fold onto each other; and
a flexible coupling connecting the two parts.

26. A device according to claim 13, wherein the device is in the form of a button.

27. A device according to claim 13, comprising a soft exterior surface.

28. A device according to claim 13, further comprising a motor configured to vibrate according to an amount of remaining battery power.

29. A device according to claim 13, further comprising a motor configured to vibrate if the measured movement as a function of time during the second period of time is not within the derived typical movement area or not aligned with the derived typical movement schedule based on the comparison.

30. A device according to claim 13, wherein the device is in the form of an electronic tag.

* * * * *